Patented Aug. 25, 1953

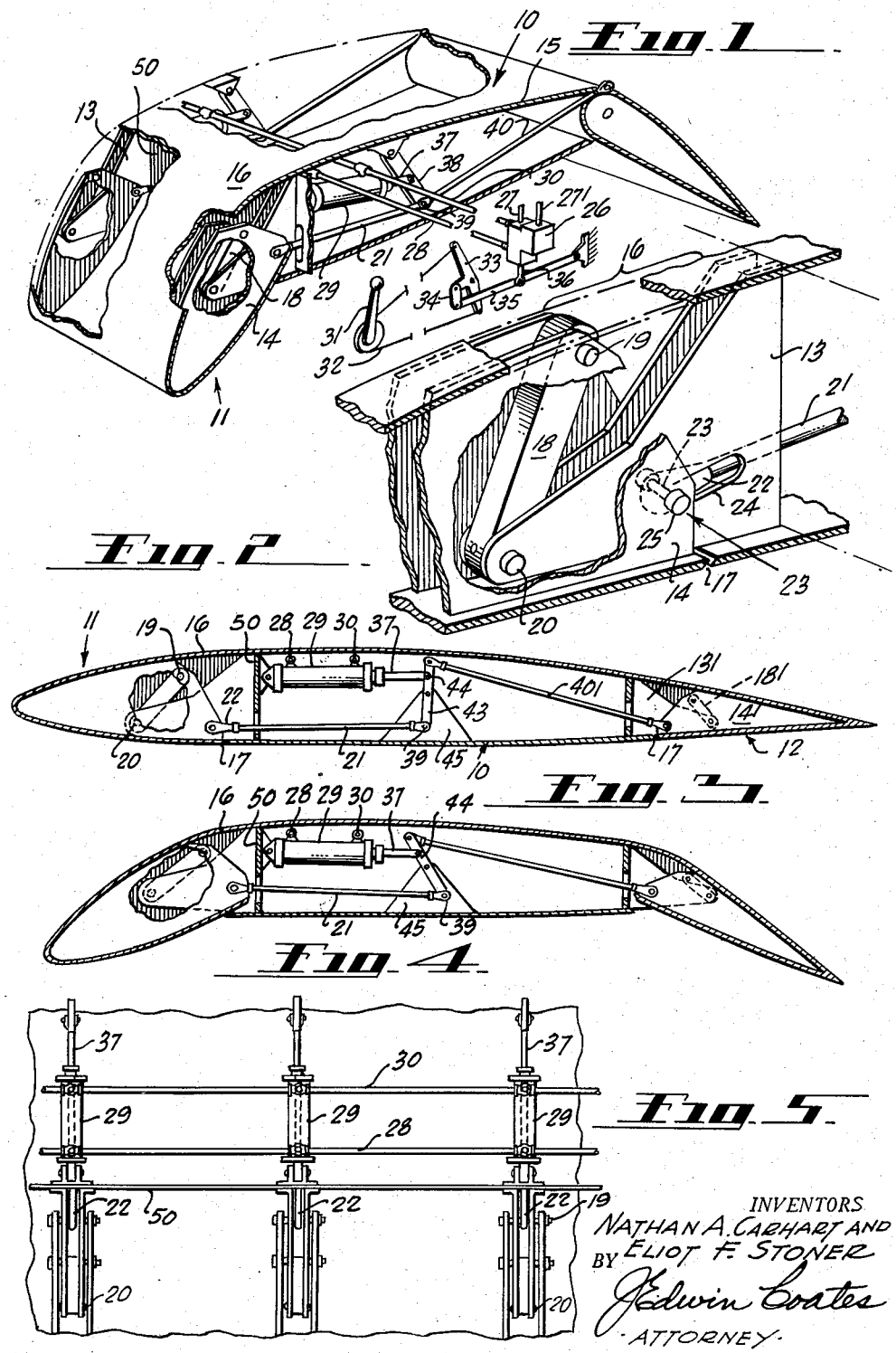

2,650,047

UNITED STATES PATENT OFFICE 2,650,047

VARIABLE CAMBER WING

Nathan A. Carhart and Eliot F. Stoner, Los Angeles, Calif., assignors to Douglas Aircraft Company, Inc., Santa Monica, Calif.

Application January 22, 1949, Serial No. 72,226

7 Claims. (Cl. 244—44)

1

This invention relates to ultrahigh-speed airplanes and particularly to the lift-producing or intensifying airfoils thereof.

Such airplanes of necessity have wings of small area and thin sections, for one reason in order to minimize the drag generated thereon by their exceedingly high top speeds. As a consequence, the lift produced at the relatively low speeds of landing and takeoff may be insufficient to sustain the craft which consequently may stall and spin in.

Variable area wings, Fowler type flaps, slats and slots, boundary layer control devices and other such lift intensifying means are unemployable in such aircraft, one reason being that the wing is too thin to accommodate their bulky supporting structures and operating mechanisms within the confines of the wing.

Variable camber wings, including downwardly reflexible leading edge sections, have been proposed heretofore for the purpose of intensifying the lift of wings in the low speed flight regimes, but because of their bulky construction, and the complexity of their operating means, they too are excessively difficult to fit into the contour of thin, high speed airfoil sections. Furthermore, when such nose sections are downwardly reflexed, the contour of the wing is deformed out of proper aerodynamic conformation and produces an amount of drag out of proportion to the augmentation of life provided thereby. Moreover, downward deflection of such variable camber devices inevitably forms a structural gap between the droopable nose section and the rest of the wing and this gap constitutes an aerodynamic discontinuity in the critical upper surface of the airfoil which not only destroys the optimum aerodynamic contour of the airfoil but, in ultra high speed airplanes, introduces an additional drag factor of a magnitude that is sometimes critical even in the landing and takeoff regimes.

The present invention provides a variable camber wing which furnishes ultra high speed airplanes with the extra lift needed at takeoff and landing without introducing any of the aforesaid disadvantages. The camber varying means essentially includes a specially constructed, mounted and operated airfoil disposed forwardly of the main body of the wing and downwardly reflexible either alone or in conjunction with either a downwardly reflexible trailing edge flap or a downwardly reflexible airfoil similar to the first-said airfoil but constructed and mounted in a reverse manner, the first-said airfoil, in either combination, serving to increase the effective camber of the wing without introducing any structure or operating means that cannot be accommodated within the profile of even a very thin wing and without incorporating the aforesaid gap or discontinuity or introducing any extra drag factor. The present novel airfoil is pivotally mounted to either the rearwardly or the forwardly adjacent spar of the fixed airfoil whose forward or rearward camber, or both, it is to increase. The flexed airfoil may be either a wing or a flap. Although the construction of the airfoil's mounting and operating means is such as to enable it to be reflexed downwardly into that specific position which confers the greatest lift augmentation while forming the resultant airfoil shape into the optimum relatively low-drag aerodynamic contour for the landing and takeoff regimes, it can also be actuated into intermediate positions to vary the lift augmentation proportionately to any speed and loading of the aircraft.

Because the droopable nose section is united to the foremost spar by an integral rearward continuation of the upper skin of the nose section, which continuation is constituted by a strong, flexible impervious sheet member and extends rearwardly in an unsupported and unattached manner, the joint between the nose section and the remainder of the airfoil remains closed both when this section is aligned with the rest of the wing and when it is downwardly reflexed. Thereby, practically no additional drag is introduced and the aerodynamic integrity and flow-laminarity of the upper curvature of the airfoil is preserved from the entering edge line to the trailing edge line of the airfoil. The reflexible nose section is partially suspended from the adjacent spar by the flexible skin connecting it thereto and is positively but pivotally supported at spanwise spaced stations by linkage means which define a rigid triangle which remains rigidly, but shiftably disposed under the flexible portion of the nose section in all positions of the latter and takes all the primary loads, thus entirely relieving the flexible portion of the nose section of all stresses except those arising from reflexing and ordinary aerodynamic forces.

Other objects and advantages of the invention will be made manifest as this disclosure proceeds.

By way of exemplification and clarification of the foregoing concepts, two embodiments thereof are illustrated in the accompanying drawing and will be described hereinafter in conjunction therewith. It is to be understood however, that such showing and description in no manner limit the invention, the scope and ambit of which are defined constructionally in their essence in the annexed claims.

In the drawing:

Figure 1 is a perspective of one of the presently preferred constructional forms with the reflexible nose section deflected downwardly in conjunction with the downward deflection of a trailing edge flap operationally connected thereto;

Figure 2 is a fragmentary perspective of a section of the droop nose portion illustrating the construction of the mounting and operating means on a larger scale;

Figure 3 is a chordwise section of a wing provided with one of the present reflexible airfoil sections at both its forward portion and its trailing portion, the operating mechanism for these reflexible sections being shown in its low camber status and maintaining the reflexible sections in alignment with the remainder of the airfoil;

Figure 4 is a similar section showing the operating mechanism actuated to downwardly reflex both movable airfoils; and Figure 5 is a fragmentary top plan view of the construction of Figure 1 with the covering removed to illustrate the elements of the invention.

As illustrated in Figure 1, the improved wing provided by the present invention comprises a main body portion 10 constructed in the conventional manner except where necessary to support portions of the novel construction, a downwardly reflexible leading edge or nose portion 11 and a trailing edge flap 12 operationally connected to the portion 11 in the manner hereinafter described.

Extending forwardly from the foremost spar 50 of the body of the airfoil at spanwise spaced stations are a plurality of pairs of plates 13 laterally spaced from each other to form brackets. Each bracket is embraced by a pair of parallel, laterally spaced rib plates 14 forming part of the reflexible nose section. The upper surface of the wing, from the leading edge line to the flap cutout in the trailing edge portion thereof, is constituted by a continuous skin 15 which may be composed of the usual metallic alloy but of somewhat thicker gage than is conventionally employed. A portion of the skin 15 is joined forwardly to the rear end of the ribs 14 and joined rearwardly to the upper edges of the brackets 13 as well as to the upper margin of spar 50, leaving the intermediate area 16 of the upper skin unattached, unsupported, and flexible. As hereinafter made manifest, this portion, never being subjected to compression loading, never buckles, peaks or corrugates, always moving in a faired curve to its arcuate downwardly deflected position from its normal position. The lower skin of the wing is divided, just to the rear of the rearward end of the ribs 14, by a slit 17, this discontinuity extending the full spanwise dimension of the variable portion of the wing.

The airfoil 11 is connected to the adjacent spar 50 by means of the flexible intermediate skin portion 16 and is positively supported at each bracket station by a doubly-pivoted link 18 embraced by the bracket plates 13 and connecting the rear upper portion of the ribs 14 to the forward end of each bracket. Each link includes on its upper end, a double-ended pivot pin 19, the pin turning at each end in the adjacent rib. A double-headed pivot-bolt 20, which is mounted in the forward end of the bracket, revolvably anchors the lower end of the link. Force for operating the reflexible section is provided through an actuator rod 21 and hydraulic motive means hereinafter described for actuating the actuator rod. The rod 21 terminates forwardly in a head 22 disposed longitudinally between the bracket plates. A double-headed pin 23 is, in the illustrative embodiment, employed to attach the terminal to the ribs of the nose portion. The shank of this pin works back and forth in upwardly inclined slots 24 in the bracket plates, each of the heads 25 of the pin 23 securing the adjacent rib to the head 22.

It will be observed that the semi-floating droopable nose section, flexibly connected to the main body of the airfoil by the flexural skin connection, is pivotally supported at each of a plurality of spanwise spaced stations by the two pivot points of the link 18 and the pin 23 on the actuator rod. These three points define a rigid but shiftably deformable triangle disposed under the flexible portion of the upper skin at all times and in all positions of the droopable nose. It thus takes all the primary loads of the nose section and entirely relieves it and the flexible connecting skin of all stresses except those arising from the downward reflexing of the nose section and from the ordinary aerodynamic forces. Consequently, the nose is supported in a stable, trussed manner in all conditions of flight.

The upper surface of the forward portion of the airfoil is forced to take an arcuate shape by virtue of the negative pressure thereon and by the natural flexure properties of the skin. This shape is deemed best for obtaining the best ratio of lift to drag in the high camber condition of the airfoil.

Force is applied to the rod 21, in the presently selected form of the invention, by a hydraulic system representationally shown as including a valve box 26, mounted suitably in the wind and connected by supply lines 27 and 271 to a source of hydraulic power mounted in the fuselage, not shown. A common pressure-applying line 28 leads from the valve-box to the input end of a hydraulic jack 29 pivotally mounted on the foremost spar of the wing behind each bracket 13. The common fluid-return line 30 from these jacks enters the rear part of the valve box. A crew-operable control lever 31 for the valve in the valve box is arbitrarily illustrated as disposed underneath the wing, its true location being in a crew station in the fuselage. This lever is connected by a cable 32 to a double bell-crank 33 pivotally mounted to the wing framing. A link 34 is pivotally connected at its upper end to the center arm of the bell-crank and at its lower end to the forward end of a valve operating arm 35 which is pivoted at its rear end to the wing framework. The arm 35 is pivotally connected in its medial portion to the lower end of the valve rod 36 of the hydraulic control valve, a conventional followup system being provided within the casing so that the position of lever 31 will determine the extent of droop of airfoil 11. The piston rod 37 of the hydraulic jack is connected at its outer end to the medial portion of an operating link 38 which is pivotally connected at its lower end to the rear end 39 of the actuator rod 21 and to the forward end of the operating rod 40 of a trailing edge flap 12, constructed, mounted and functioning in the conventional manners.

When lever 31 is pushed forwardly as during landing and takeoff of the high speed airplane, the valve is opened in the appropriate direction and pressure fluid is applied to the jack, resulting in substantially simultaneous deflection downwardly of both the camber-increasing airfoil 11 and the trailing edge flap 12. The effective camber of the wing is thus materially increased to provide greatly augmented lift in the low speed regimes of the thin-section wing. However, by virtue of the continuous flexible upper skin connection between airfoil 11 and the body of the wing, the drag produced thereby is only that small amount which is concomitant to the corresponding augmented lift; that is to say, only induced drag is produced by the downward deflection of the nose section, there being no gap to produce turbulence and extra drag. Moreover, it will be perceived, the aerodynamic contour of the nose of the resultant airfoil is, at least on its upper surface substantially a continuous circular arc extending from the leading edge to the flap cutout, the upper surface of the highly cambered wing is uninterrupted and includes no gaps, thus providing a continuous pressure-distribution curve over the entire upper surface instead of producing a wide break in the forward portion of the pressure distribution curve which would eliminate lift in the gap-region and instead produce drag. It is to be noted that the simultaneous downward deflection of the airfoils 11 and 12 produces substantially equal and opposite torsional moments around the spanwise center line of the wing, these moments substantially neutralizing each other and thus relieving the wing of unbalanced torsional stresses, as well as greatly reducing the pitching moment.

Reversing the operational position of the lever 31 opens valve 26 in the opposite sense and, of course, results in restoring the nose 11 and flap 12 to their original undeflected, normal-camber positions, which positions they occupy in the high-speed flight regimes.

The principle and the construction of the forward airfoil just described are shown in Figures 3 and 4 as applied to both the entering edge and the trailing edge of a lift surface, that is to say; the flap 12 of Figure 1 is here replaced by an airfoil constructed, mounted and operated like the flexible nose section and is operationally interconnected therewith. The cutout and the upper skin gap usually found in the conventional trailing edge flap construction are thus entirely eliminated, the upper skin of the flap being integral with, or connected to, the upper skin of the lift surface in a structurally and aerodynamically continuous manner. The flap 12 deflects downwardly carrying a portion of the upper skin and the mechanical properties of this skin continuation and the negative pressure existing in this region forces the upper skin from the rearmost spar to the foremost portions of the flap ribs to conform to an arc of a circle and maintains the wing contour in a shape suitable for effecting smooth laminar flow of the airstream therealong. Thus the sometimes excessive augumentation of drag normally incidental to flap downward deflection is obviated without increasing the complexity and weight of the structure as by the employment of a gap closing gates and the like.

To achieve these and other ends, the construction of the rearward portion of the wing comprises, substantially in the manner described with reference to the forward portion of the wing of Figures 1 and 2, a plurality of spanwise spaced pairs of parallel bracket plates 131 mounted on the rearward face of the rearmost spar of the body of the wing and projected rearwardly to support the flap 12. The flap, like the nose section of Figures 1 and 2, includes rib plates 141 embracing the brackets, these plates being connected to the brackets by pivoted links 181, constructed as and for the purposes previously described. The flap is operationally connected to the nose section by hydraulically energized actuating means 401 substantially like those described with reference to the previous embodiment. The actuating rod 401 is connected, similarly to the rod 21, to the forward portion of the rib plates 141 of the flap in the same manner as that previously described. The forward end of the actuator rod is pivotally attached to the upper end of a cross-head 43, the lower end of which is pivotally connected to the actuating rod 21 for the reflexible nose section. The cross-head is pivoted to suitable wing framing 45 in its medial portion, and the piston rod 37 of a rearwardly extending hydraulic jack 29, pivotally mounted on the rear face of the foremost wing spar, is pivotally connected to the intermediate portion 44 of the upper arm of the cross-head. A pilot operable control system such as that previously described herein may be provided for actuating the jack and operating the nose section and the flap in unison but in opposite directions to increase the effective camber of the airfoil and thereby augment its lift in low speed regimes while practically eliminating torsional stress around the longitudinal axis of the wing and excessive pitching moments. Because of the large alteration of effective camber provided by the reflexible nose section in conjunction with the downward deflection of the flap, it is not necessary that the area or chordwise extent of the trailing edge flap be as great as customary for an airplane of given size, nor that the flap be deflected downwardly to obtain the desired lift augmentation as far as is necessary in conventional flap systems. The same facts, of course, are equally true of the embodiment shown in Figures 1 and 2.

The operation and functioning of this form of the invention are obviously the same as that of the initially described embodiment despite the fact that the upper skin is continuous from the entering edge to the trailing edge line. It is to be observed that, in all forms of the invention, the angling of the slots 24 to the direction of the load applied to the nose section modifies the direction of the load applied to the rod 21 and hence prevents bending and flexure of the push-pull rod.

We claim:

1. In an airfoil construction that includes a main airfoil portion and a semi-floating droopable section flexibly suspended at its upper inner surface by an integral flexible portion thereof from the adjacent surface of the main airfoil portion; means for positively and pivotally supporting said section for downwardly reflexing same, comprising: a support attached at one end to, and projecting longitudinally from, the main airfoil portion; a link disposed between the unattached end of the support and the upper inner surface of said section and pivotally connected at its ends to the support and to said section; and an actuating member for reflexing said section pivotally attached to the lower adjacent surface of said section, the aforesaid pivot points together defining a triangular truss-like structure having rigid sides disposed under the flexible portion of said airfoil construction, said sides being pivotally adjustable by the actuating member into positions defining a series of triangles taking all the stresses in all positions of said flexible portion except those due to flexure of the latter and to aerodynamic forces.

2. In an airfoil construction that includes a semifloating droopable nose section flexibly suspended from said airfoil by a flexible continuation of the upper skin of said section: brackets projecting longitudinally from said airfoil into the confines of said section; a rigid link pivotally attached by one of its ends to the free end of each said bracket and pivotally attached at the other of its ends to the upper adjacent portion of said section; and a chordwise extending reciprocatable actuating member pivotally attached at its free end to the lower portion of said section for effecting rotation of same about its spanwise axis; the pivotal connections of said link and the pivotal connection of said actuating member being arranged to define a triangular truss-like structure having rigid sides disposed under the flexible portion of said airfoil construction, said sides being pivotally adjustable by the actuating member into positions defining a series of triangles taking all the stresses in all positions of said flexible portion except those due to flexure of the latter and to aerodynamic forces.

3. In an airfoil construction that includes a semi-floating droopable section disposed in chordwise adjacency to a spanwise edge of a supporting airfoil: means for flexibly and supportedly suspending said section from the supporting airfoil for downward reflexing, comprising a skin extending uninterruptedly from at least the inner edge of the upper portion of said section to the adjacent edge of the upper portion of said supporting airfoil and flexible upwardly and downwardly in a faired wrinkleless, curve; a bracket extending longitudinally from said supporting airfoil into said section; and a link disposed between said bracket and the upper adjacent edge of said section and pivotally attached at its respective ends to the respectively adjacent portions of the bracket and of said section.

4. An airfoil construction comprising: a main body portion; an auxiliary portion disposed in chordwise adjacency to one of the spanwise edges of said body portion; a chordwise extending bracket carried by said body portion; a link pivotally carried by the free end of said bracket and extending upwardly and inwardly toward said body portion; a pivotal connection between the free end of said link and said auxiliary portion; a chordwise movable actuator carried by said body portion and pivotally attached to a second point on said auxiliary portion; and means to move said actuator to tilt said auxiliary portion about said pivotal connection with the free end of said link and to simultaneously swing said link about its pivotal connection with said bracket.

5. A reflexable nose construction for lift surfaces, comprising: an airfoil main body; a rigid, discrete reflexable, spanwise-extending, internally framed airfoil nose-section arranged in chordwise adjacency to said main body; a smoothly flexible expanse of material extending chordwise and spanwise freely and substantially "floatingly" between the adjacent upper edges of said main body and said reflexible nose section and forming a discrete airfoil surface continuation lying freely and floatingly between said main body and the internal framing of said airfoil section; spanwise extending main body bracing means disposed in said body in chordwise juxtaposition to said nose section; a chordwise elongate, cantilever, nose section supporting member having its rear end-portion attached to said main body bracing member and having its front end portion extending into said nose section; elongated connecting means extending from the outer end portion of said supporting member to the upper rear portion of said nose section, said connecting means being pivotally attached at its one end to the front end portion of said cantilever nose-section supporting member and said connecting means being attached at its opposite end to the upper inner edge of said nose section; a chordwise member of the internal framing of said nose section having its rear end portion terminating rearwardly of the forward end of the nose-section supporting member; and chordwise displaceable operating means connecting the rear end portion of said chordwise framing member to said supporting member; the aforesaid configuration enabling said rigid nose section to be bodily reflexed with said front end portion of said elongate member serving as an axis of rotation and with its original aerodynamis contour intact and unaltered from its optimum aerodynamic characteristics.

6. A sustentation surface construction, comprising: a main airfoil portion; a spanwise extending, reflexible auxiliary airfoil portion disposed in chordwise adjacency to said body portion and forming a nose section; a smoothly flexible chordwise and spanwise extending discrete expanse of airfoil surfacing material lying freely and substantially floatingly between the upper adjacent edges of said main airfoil portion and attached at chordwise opposite portions thereof to said airfoil portions so as to form, on reflexing and return of said nose section, a smoothly continuous faired and continuously curved upper surface extending, free and discretely, from the rear upper edge of said nose section rearwardly to said main body portion so as to constitute said expanse in effect a suspensor for said reflexed auxiliary airfoil portion; rigid elongate supporting means for said auxiliary airfoil extending chordwise of said auxiliary surface and having its one end portion fixed to said main body portion and having its opposite end portion extending into said auxiliary airfoil, said opposite end portion providing an axis of rotation around which said auxiliary airfoil is adapted to be reflexed; elongate connecting means extending from said free opposite end portion of said chordwise-elongate supporting member to the upper edge of said auxiliary airfoil adjacent said main body portion, said connecting means being pivotally attached at the one end thereof to said free end and being pivotally attached at the opposite end thereof to said upper edge, thereby to constitute said connecting means substantially a radius rod which, together with said flexible expanse of airfoil surfacing material, enables said auxiliary airfoil section to be bodily downwardly reflexed around said axis of rotation so as to reflex said upper surface, from the upper surface, from the upper rear edge of said nose-section to said main body portion, downwardly on a faired, gapless curve, the sustentation surface then having the optimum high lift and low drag contour for landing and take-off.

7. In an airfoil construction that includes a semi-floating, droopable section disposed in chordwise adjacency to a spanwise face of a supporting airfoil; means for flexibly suspending said section from said supporting airfoil for enabling downward reflexing of said section into a continuous natural aerodynamic contour, thereby obviating discontinuity-drag, comprising: a continuous skin extending uninterruptedly from at least the inner portion of the upper surface of said section to the adjacent portion of the upper surface of said section to the adjacent portion of the upper surface of said supporting airfoil and integral with the last-said surface, the surface-portion common to both airfoils and lying between the separated, or main, distinct portions of said airfoils being unsupported and bodily flexible in its entirety and free to flex downwardly to its maximum extent, through a region of the airfoil's configuration that is free from interfering obstacles, in a faired, uninterrupted, continuous and unpeaked curve devoid of irregularities; elongate supporting means extending chordwise of said droopable section and having its rear portion fixed to said supporting airfoil and having its front portion lying free in said droopable section; and elongate connecting means extending from the free end of said supporting means to the upper rear edge-portion of said droopable section and pivotally connected at its oppostie ends respectively to said free end and to said edge portion; whereby to enable reflexing of said droopable section in a gapless manner while maintaining the continuity of the pressure-distribution curve on the upper surface of the airfoil's assembly so as to achieve full theoretical lift-effect for each deflection of said section while obtaining only the concomitant profile and induced drags.

NATHAN A. CARHART.
ELIOT F. STONER.

References Cited in the file of this patent

UNITED STATES PATENTS

| Number | Name | Date |
|---|---|---|
| 1,506,146 | Ziemss | Aug. 26, 1924 |
| 1,763,888 | Griswold | June 17, 1930 |
| 1,766,107 | Cook | June 24, 1930 |
| 1,890,059 | Lake | Dec. 6, 1932 |
| 2,254,304 | Miller | Sept. 2, 1941 |
| 2,312,546 | Hazard | Mar. 2, 1943 |
| 2,365,382 | Bolkow | Dec. 19, 1944 |